Oct. 9, 1951      G. C. DILLARD      2,570,653
AERIAL CAMERA CARRIAGE

Filed Feb. 18, 1946      4 Sheets-Sheet 1

Guy C. Dillard
INVENTOR.

BY

ATTORNEY

Oct. 9, 1951 G. C. DILLARD 2,570,653
AERIAL CAMERA CARRIAGE
Filed Feb. 18, 1946 4 Sheets-Sheet 2

Guy C. Dillard
INVENTOR.

BY Cecil L. Wood

ATTORNEY

Oct. 9, 1951        G. C. DILLARD        2,570,653

AERIAL CAMERA CARRIAGE

Filed Feb. 18, 1946        4 Sheets-Sheet 3

Guy C. Dillard
INVENTOR.

BY Cecil L. Wood

ATTORNEY

Oct. 9, 1951   G. C. DILLARD   2,570,653
AERIAL CAMERA CARRIAGE
Filed Feb. 18, 1946   4 Sheets-Sheet 4

Guy C. Dillard
INVENTOR.
BY Cecil L. Wood

ATTORNEY

Patented Oct. 9, 1951

2,570,653

UNITED STATES PATENT OFFICE 2,570,653

AERIAL CAMERA CARRIAGE

Guy C. Dillard, Fort Worth, Tex.

Application February 18, 1946, Serial No. 648,279

5 Claims. (Cl. 74—5.22)

This invention relates to aerial photographic equipment and it has particular reference to aerial camera carriages and its principal object resides in the provision of a gyroscopically controlled camera support whereby aerial photographs can be taken with greater accuracy and uniformity than currently possible with conventional equipment.

Another object of the invention resides in the provision of an aerial camera support capable of maintaining the camera constantly in a perpendicular position irrespective of the ever changing positions of the carrier aircraft which is subject to the action of air currents, and other factors, which prevent the craft from moving in a level plane and, when conventional equipment is employed, resulting in non-uniform and distorted photography.

Still another object of the invention is that of providing a camera support in which is embodied salient features of construction designed to minimize vibration and shock which may be transmitted to the camera by the movements of the supporting aircraft which would adversely affect the quality of photographs taken and result in considerable waste and inefficiency.

Broadly, the invention contemplates the provision of a balanced, flexible and readily adjustable camera carriage which will provide for greater efficiency in operation and produce a more desirable result in making aerial surveys where it is expedient to make several series of photographs which are intended for use in preparing aerial maps, and the like.

While the foregoing objects are paramount, other and lesser objects will become manifest as the description proceeds, taken in connection with the appended drawings wherein.

Figure 3:
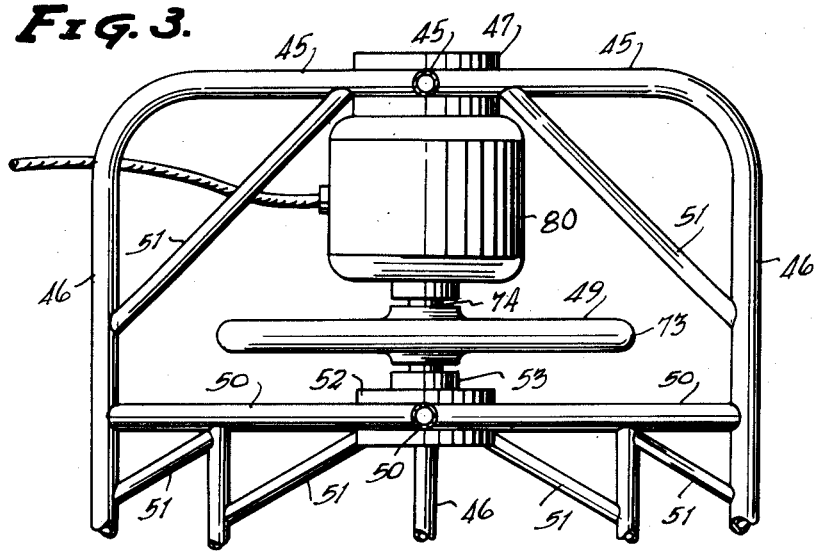

Figure 3 fragmentarily illustrates the upper portion of the camera frame showing a motor driven gyroscopic wheel, an optional structure.

Figure 4:
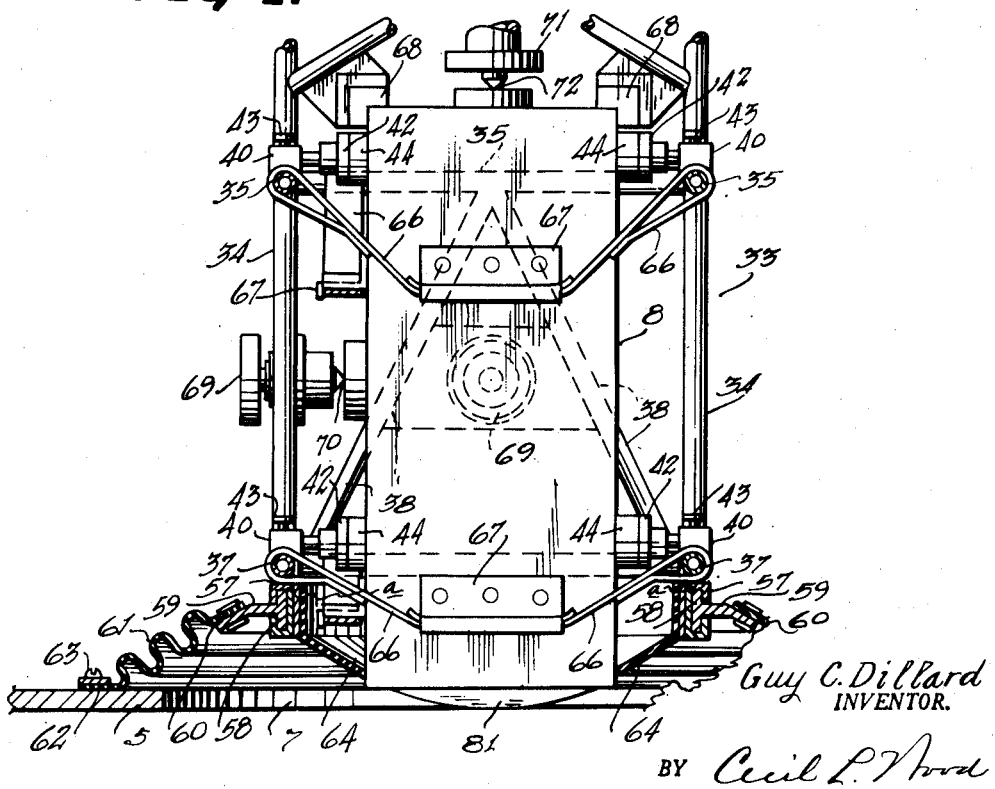

Figure 4 shows the camera frame, partially in cross-section and with portions cut away, illustrating a camera supported therein and means for adjusting the same in said frame.

Figure 5:
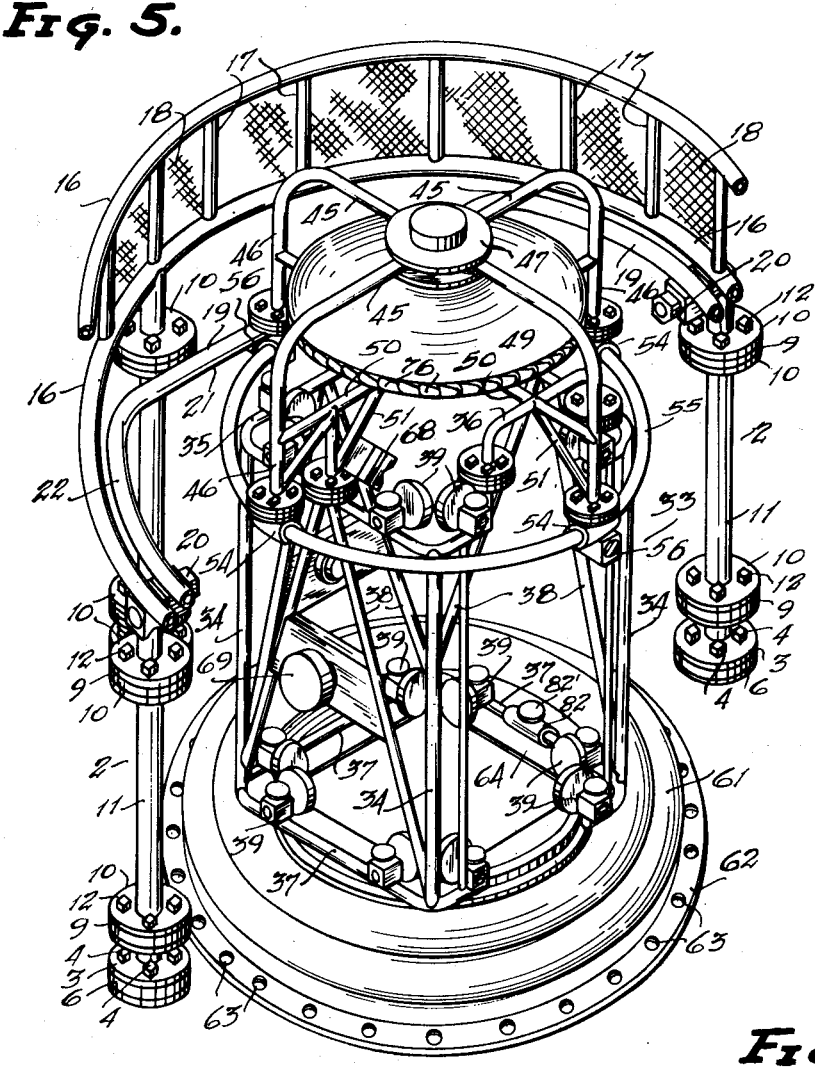

Figure 5 is a perspective view of the invention, the supporting frame being shown cut away, illustrating the wind driven gyroscopic wheel and camera securing means.

Figure 6:
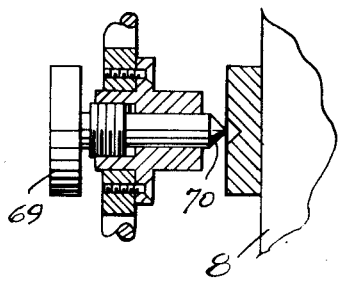

Figure 6 is a fragmentary cross-sectional illustration showing one of the camera adjustments by which the same is adjusted in the frame.

Figure 7:
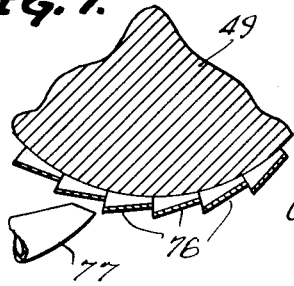

Figure 7 is a fragmentary lateral section showing the air driven gyroscopic wheel preferably employed in the invention.

Figure 8:
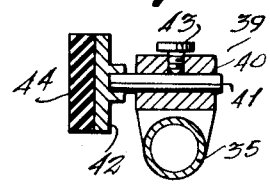

Figure 8 illustrates, in sectional detail, one of the adjustable camera stays.

Figure 9:
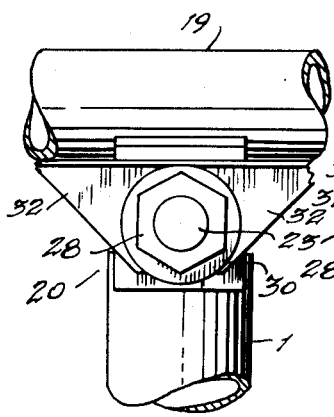

Figure 9 is a fragmentary illustration of one of the frame pivots, the same being shown front elevation.

Figure 10:
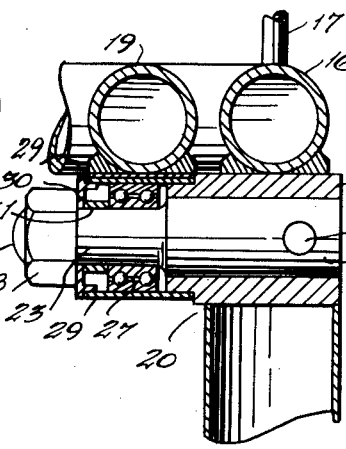

Figure 10 is a longitudinal cross-section of one of the pivots of the frame structure showing cylindrical frame members in lateral and vertical sections.

Figure 11:
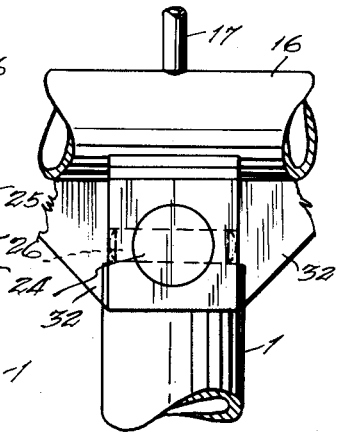

Figure 11 fragmentarily illustrates a pivotal frame coupling in rear elevation opposite the view shown in Figure 9.

Figure 12:
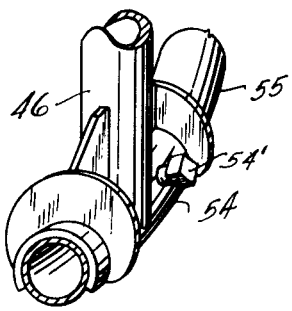

Figure 12 is a fragmentary perspective view of one of the sliding frame connections.

Figure 13:
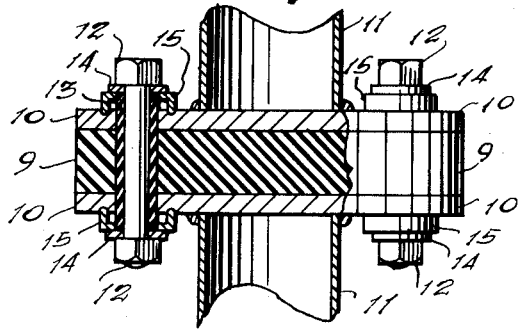

Figure 13 illustrates, in partial section, the preferred form of frame coupling designed to minimize vibrations and shock.

Figure 14:
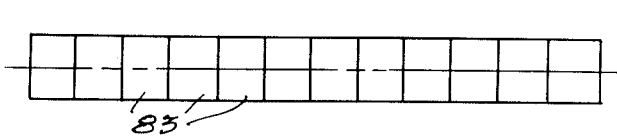

Figure 14 diagrammatically illustrates a series of photographic panels, taken by a camera installed in the invention, and depicting the uniformity of alignment.

Figure 16:
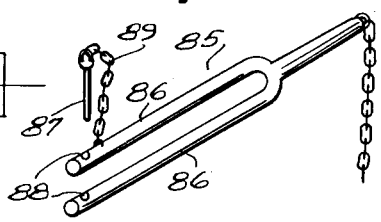
Figure 15:
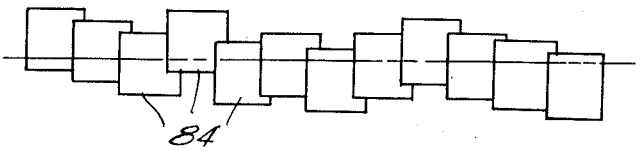

Figure 15 is a diagrammatic illustration showing a series of photographic panels taken with conventional equipment and illustrating the irregular arrangement thereof, and Figure 16 is a perspective illustration of a fork employed in locking the frame assembly in a unit when the invention is not in use.

The invention comprises a rigid supporting frame 1 which consists of a plurality of standards 2, each having a flange 3 integral with its lowermost end by which it is secured by bolts 4, or other suitable devices, to the floor 5 of an aircraft. Each flange 3 is separated from the floor 5 by a suitable insulating disc 6 of rubber, or the like, having sufficient resiliency to minimize vibration and shock which would otherwise be capable of transmission to the standards 2 by the movements of the plane in which the invention is mounted. A similar arrangement is illustrated in Figure 13 and will be described in greater detail presently.

The frame 1 is arranged about an opening 7 in the floor 5 so that the camera 8 supported in the assembly may be focused through the opening 7 which is of sufficient diameter to permit of a suitable focussing range, as illustrated particularly in Figure 4.

Figure 2:
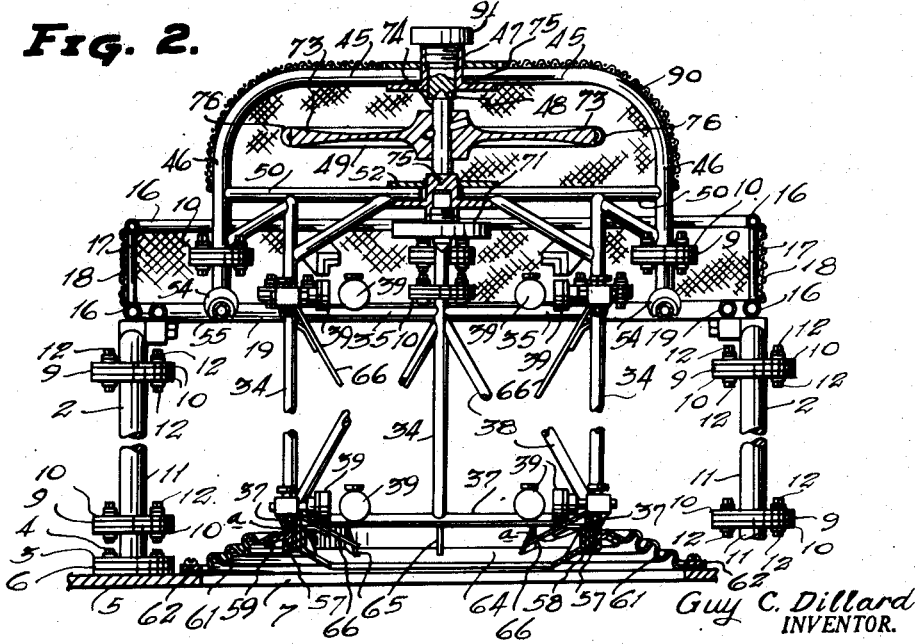
Figure 2 illustrates the invention in vertical cross-section, taken on lines 2—2 of Figure 1, and showing the arrangement of flexible closure around the camera opening in the plane floor.

It is also desirable to provide spaced resilient couplings in the standards 2, as shown in Figures 2 and 5, and illustrated in detail in Figure 13. Each of the couplings comprise resilient discs 9, of a rubber-like composition, interposed between integral flanges 10 secured to the ends of tubular sections 11 of the standards 2, and retained by a plurality of bolts 12 arranged about and through both flanges 10 and the disc 9.

Each bolt, however, is embraced by a composition sleeve 13 of a material similar to the discs 9 and the ends of this member are separated from the head and nut of each bolt 12 by fiber washers 14 or washers of some non-metallic material having some degree of resiliency, while flanged washers 15 are provided on each end of each bolt 12 to bear against the flanges 10 in the manner shown in Figure 13. This arrangement affords a non-metallic contact of any character between the sections 11 of the standards 2 and thus minimizes shock and vibrations.

A circular frame-work, comprising a dual arrangement of rings 16 spaced and integrally connected by a plurality of vertical standards 17, is rigidly attached to and supported by the standards 2, as shown in Figures 1, 2, 5, 10 and 11. This structure constitutes the supporting frame for the invention. For the protection of the operator while the invention is in operation a screen 18 of a foraminous material is arranged upon the circular frame-work around the top of the standards 2 just described.

A subframe, comprising a ring 19, is supported in the upper portion of the supporting frame 1 on pivots 20, shown in detail in Figure 10, which will be presently described in detail. The frame 19 does not define a true circular form, as apparent in Figures 1 and 5, but has straight sides 21. The pivots 20 are arranged on and fixed to the curved ends 22 which conform to the circular form of the frame 1 and are suitably spaced therefrom for proper movement with respect thereto.

The pivots 20, previously referred to and shown in detail in Figure 10, consist of stub shafts or spindles 23 having their larger body portions 24 arranged in sleeves 25 integral with the supporting frame 1 and pins 26 extend through the sleeves 25 and the portions 24 of the spindles 23 to rigidly secure the latter. The spindles 23 have bearings 27 arranged thereon and each has a nut 28 threaded upon its inner end to secure the bearing assemblies 27 in position.

Each bearing 27 has a sleeve 29 therearound which is rotatably supported on one end by the sleeve 25 and on its opposite end by a flanged washer 30 against which the nut 28 is threaded. A spacer ferrule 31 separates the washer 30 from the bearing 27 in each pivot assembly 20. The ring 19 is rigidly secured to a pair of depending brackets 32, each of which is integral with the sleeve 29. Thus the subframe or ring 19 can pivot independently of the frame 1 and for a purpose which will become manifest.

The camera 8 is adjustably supported in a frame structure 33, as shown in Figure 4. The frame 33 is illustrated in perspective in Figure 5 and comprises vertical standards 34, arranged in a substantially rectangular formation, and integrally connected at their upper ends to a rectangular frame 35, one side bar 36 of which is elevated above the normal plane of the other three sides affording a larger opening in the frame 33 on this side to provide for free access to the camera 8 in operation. This arrangement will be better understood as the description proceeds.

The lower frame 37, while rectangular in form and similar in other respects to the frame 35, has only three sides, the open side being beneath the member 36 cooperating in providing for the greater opening in the frame 33. Suitable angular braces 38 are provided in the frame structure 33 to strengthen the same. A plurality of adjustable camera engaging clamps 39 are integrally arranged upon all sides of the frames 35 and 37 by which the camera 8 is secured and stabilized within the frame 33. The clamps 39 are shown in detailed cross-section in Figure 8. The frame structure 33, as well as the supporting structure previously described, is preferably constructed of tubing material of suitable weight and durability.

The clamps 39, as apparent in Figure 8, comprise supporting bodies 40 which are integrally secured to the frames 35 and 37. The supporting body 40 of each has a bore arranged horizontally therethrough, transverse to the frame member to which it is attached, in which is adjustably arranged the stem 41 of the camera engaging disc 42. The stem 41, when adjusted, is secured by a set-screw 43.

The engaging face of the disc 42 is covered by a composition material 44 such as rubber, felt, or the like, and serves to minimize the transmittal of any movement or shock to the camera 8 by the movements of the carrier plane. Each clamp 39 is adjusted against the sides of the camera 8, as shown in Figure 4, and secured by the set-screw 43.

The entire frame assembly 33 is supported by a super-frame structure which is formed with a plurality of radial members 45 whose outer ends are turned downwardly and provide a plurality of legs 46, as shown in Figures 1, 2, 3 and 5. The inner ends of the members 45 are secured by a central fitting 47 providing the upper pivot bearing 48 of a weighted wheel 49 whose function and further description will become apparent. The legs 46 of the superframe structure are connected together by a radial arrangement of horizontal tubular links 50 which have suitable angular braces 51 and support a central fitting 52 which provides the lower pivot bearing 53 of the wheel 49. The member 52 also has another function which will presently become manifest.

The lower ends of the legs 46 have integral shoes 54, as shown in Figure 12, which are semicircular in lateral section and arcuate longitudinally to conform to the tubular and circular form of a horizontally arranged ring 55 which supports the camera frame 33 and its superstructure. The ring 55 is supported on opposite sides of the straight sides 21 of the ring 19 by pivots 56, as shown particularly in Figure 5, so that the auxiliary frame structures can freely swing within the supporting frame 1. The pivots 56 are identical with pivots 20 shown in detail in Figure 10.

The shoes 54 slidably engage the ring 55 in a manner permitting the frame 33 and its supporting structure to be rotated horizontally therewithin. Each of the shoes has a set-screw 54' thereon whereby the assembly can be secured in adjusted positions. Each of the legs 46 are connected to the shoes 54 through coupling assemblies such as that shown in detail in Figure 13 and previously described. Such coupling assemblies are also employed in the connecting tubular links 50 of the superframe structure. Every precaution is practiced to avoid, as much as possible, any transmission of shock or vibration to the camera 8.

The lower frame member 37 of the camera frame 33 has a ring 57 integral thereon which is substantially C-shaped in section, as shown in Figures 2 and 4, and which is formed in two sections and welded at a to provide a circular receptacle adapted to slidably receive the inner flanged rim 58 of an annular collar 59 which is substantially T-shaped in lateral section, as illustrated particularly in Figure 4. This arrangement will also permit the rotation of the frame 33. The collar 59 supports the inner circular edge 60 of an annular flexible closure 61 which surrounds the lower end of the camera frame 33 and is secured at its outer rim by a ring 62 to the floor 5 around the edge of the opening 7 therein to close the latter while permitting the camera frame 33 to swing in all directions in its perpendicular operative positions. The member 62 may be secured by rivets or screws 63, or the like, as shown in Figures 2 and 4.

Interiorly of the lower end of the frame 33 is arranged a suitable hood 64, of a flexible material, which is fashioned in such a manner as to engage the camera 8 on all sides to exclude dust, cold air, and the like, from the interior of the plane through the opening 7. The function of the hood 64 and the closure 61 are similar. It is desirable to provide integral gussets 65 to properly strengthen the hood 64 at proper intervals, as shown in Figure 2.

The camera 8 is suspended in the frame 33 by straps 66 which are connected at each end to the frame members 35 and 37. The straps support the camera 8 by brackets 67 attached thereto, as shown in Figure 4, and rigidity is afforded the camera 8 by suitably padded members 68 attached to the frame members and engaging the camera 8 at proper points. The clamps 39 adjustably retain the camera in its proper alignment with the frame.

In order to obtain the proper vertical alignment of the camera 8 a plurality of adjusting screws 69 are provided and attached to the frame 33. These members have pointers 70 which engage certain indicated markings on the camera 8 so that these markings may be arranged to correspond with an accurate position of the camera in the frame 33 which has been previously properly aligned with respect to the most perfect performance of the camera. This arrangement is illustrated in detail in Figure 6. Another screw adjustment 71 is arranged above the camera 8 and has a pointer 72 engageable with a suitable marking on the top of the camera 8 for centering the same. The screw adjustment 71 operates within the fitting 52 shown in Figure 4 and previously described.

When the pointers 70 and 72 are all seated within their markings on the camera 8 then the camera is in proper alignment and the clamps can be tightened against the camera to maintain this alignment. When proper alignment is attained the pointers 70 and 72 may be retracted to prevent damage thereto.

It is apparent that the invention is highly flexible in operation, each of the frame and subframe assemblies being independently pivoted vertically with respect to the supporting structure, thus permitting the camera 8 to remain perpendicular at all times regardless of the positions the carrier plane assumes in flight. A gyroscopic action is transmitted to the camera frame 33 by the weighted wheel 49 in the upper end thereof.

In its preferred form, shown in Figures 1, 2, 5 and 7, the wheel 49 is formed, in cross-section, with a weighted periphery 73 and has an axle 74 whose ends 75 are suitably pointed to provide free pivots engageable with the bearings 48 and 53.

Figure 1:
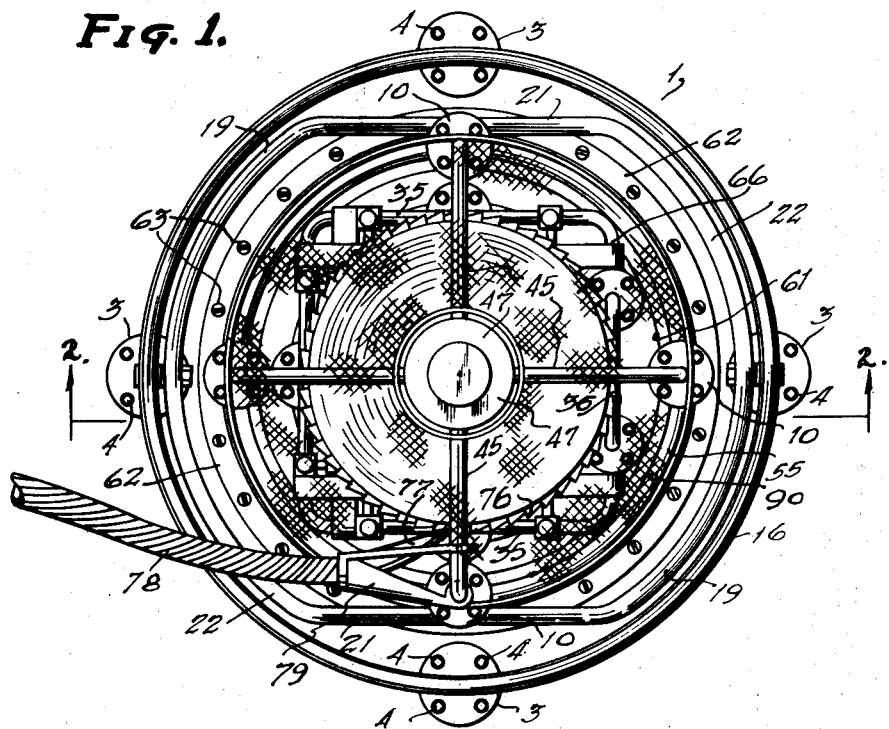
Figure 1 is a plan view of the invention showing the pivotal association of the frame structures.

About the outer rim or periphery 73 of the wheel 49 is a turbine-like arrangement of tangentially disposed cups 76 against which a stream of air is directed to cause the rapid rotation of the wheel 49 to stabilize the camera frame 33 in operation and maintain the same in perpendicular position. Air is directed on the cups 76 by a nozzle 77 on a flexible conduit 78 which conducts an air stream from an inlet port (not shown) forwardly and exteriorly of the carrier plane, the passage of the plane producing the induction of the air stream. The nozzle 77 is supported by a bracket 79 attached to one of the legs 46, as shown in Figure 1. It is contemplated that a control valve (not shown) be arranged in the conduit 78 for operation by the pilot or photographer, and that the nozzle 77 be swaged to effect a jetting action of the air.

In a modified arrangement of the stabilizer or gyroscopic wheel 49, as illustrated in Figure 3, the wheel is rotated by a motor 80 which may be arranged in the upper frame assembly either above or below the wheel 49, depending upon the location of the center of gravity of both the superframe structure and the frame 33. Unless a substantially light motor 80 is employed, it is desirable to locate the same below the wheel 49. The wheel 49, when operated by the motor 80, need not be formed with the cups 76 unless it is desirable to use the air stream as a starting medium and the motor 80 to rotate the wheel 49. The device should be so constructed as to fix the center of gravity below the upper frame assembly, or below the ring 19. It is more desirable to locate the center of gravity as near as possible to the lens 81 of the camera 8.

It is very important that the center of gravity be such as to effect the absolute alignment of the center-line of the camera lens 81 with the axis 74 of the wheel 49 and in order to accomplish this a set of sliding weights 82 are arranged on three sides of the frame 37. Each weight is provided with a set-screw 82' by which it is secured when adjusted. These members can be moved along the frame 37 until the center of gravity of the entire unit is in alignment with the center line of the camera lens 81 and the axis 74 of the wheel 49.

Obviously, when the camera 8 is maintained in constantly vertical position in operation the lens 81 thereof can be focussed upon the area below in an accurate and unbroken pattern, as schematically illustrated by the frames 83 in Figure 14. An irregular pattern of photographic shots 84 depicted by the schematic illustration in Figure 15 can be avoided and greater economy and efficiency can be practiced. The frames 84 illustrate the results obtained by conventional equipment, particularly when the carrier plane is flown in strong air currents or maneuvered improperly. The gyroscopic action of the invention affords an operative structure capable of practical results under all reasonable conditions.

The invention may be made rigid by locking the several swingable frame structures to the supporting frame 1. This may be accomplished by applying a fork 85 so that its tines 86 embrace the rings 16, 22 and 55 and the pin 87 inserted through the apertures 88 in the ends of the tines 86. The pin 87 may be secured to the fork 85 by a length of chain 89, or the like. A similar device may be used to attach the fork 85 to the invention and prevent its becoming misplaced. A protective screen 90 is provided about the radial members 45 and legs 46, as shown in Figures 1 and 2.

As shown in Figure 2, the bearing 48 may be adjusted with respect to the upper pivotal end 75 of the shaft 74 to insure the proper function of the wheel 49. It will be observed that a knob 91 is integral with the upper end of the bearing 48 by which the latter can be threaded vertically.

Manifestly, the structure herein shown and described is capable of considerable modification by persons skilled in the art without departing from the spirit and intent of the invention or the scope of the appended claims.

What is claimed is:

1. In a camera carriage for aircraft, or the like, the combination with a main supporting frame rigidly mounted in an airplane fuselage, a circular sub-frame swingingly suspended on opposite pivots in said main frame, a camera frame having pivotal support on opposite sides suspending the same in said sub-frame and a camera supported therein, means slidably supported on said camera frame providing for the rotation of said camera thereon, said pivotal supports of said camera frame arranged transversely of the axis of the pivotal supports of said sub-frame, a vertically pivoted driven wheel rotatably mounted in the top of said camera frame capable of transmitting a gyroscopic action thereto, and means comprising straps and screws for adjustably securing a camera in said camera frame.

2. In a gyroscopic camera support for aerial photography, in combination with a camera and a rigid carriage frame therefor capable of installation in an aircraft, a sub-frame comprising a horizontally disposed ring having opposite pivotal supports connecting same in said carriage frame and capable of swinging suspension therein, a camera frame pivotally suspended in said sub-frame and having its pivotal axis arranged transversely to the pivotal axis of said sub-frame, said camera frame being capable of rotatively supporting the said camera thereon, a weighted driven gyroscopic wheel vertically pivoted in the upper portion of said camera frame capable of maintaining vertical alignment of the latter, and means comprising supporting straps and in adjusting screws in said camera frame providing for adjustably supporting a camera therein.

3. In a gyroscopic camera support for aircraft, in combination with a camera and a rigid supporting frame adapted to be arranged above an opening in the floor of said aircraft, a sub-frame comprising a ring having a pivotal connection with said supporting frame and capable of swinging suspension therein, a camera frame arranged concentrically of and pivotally suspended in said sub-frame and adapted to support a camera thereon, means slidably connecting said camera to said camera frame adapting the same to rotation, a weighted driven wheel rotatably mounted in the upper portion of said camera frame and having its axis in a vertical plane, the said wheel capable of imparting a gyroscopic action to said sub-frame and said camera frame, and means comprising flexible straps in the latter for adjustably supporting a camera therein.

4. In a camera carriage for aerial photography, in combination with the floor of an aircraft having a camera opening therein, a rigidly mounted supporting frame structure, a sub-frame comprising a ring pivotally suspended in said supporting frame, a camera frame comprising a horizontal suspending ring connected to said sub-frame and having its pivotal axis arranged transversely of the pivot of said sub-frame and having a camera supported therein, the said camera being supported on said suspending ring and capable of sliding rotation thereon with respect to said sub-frame, a weighted driven wheel rotatably pivoted in the upper portion of said camera frame having its axis in a vertical plane and capable of transmitting a gyroscopic action to the sub-frame and camera frame, means for adjustably securing the said camera in said camera frame, and means for rotating said wheel.

5. In a camera carriage for aerial photography, in combination with an aircraft floor having a camera opening therein, a supporting frame arranged over said opening, a swingable substantially-circular sub-frame pivotally supported in said supporting frame, a camera supporting ring pivotally arranged in said sub-frame and having its axis arranged transversely of the pivotal supports of said sub-frame and a camera supported in said ring, the said camera supporting ring providing means for rotatably supporting a camera thereon, a weighted gyroscopic wheel mounted on a vertically arranged pivot above said camera ring and capable of maintaining the latter in a constant vertical plane.

GUY C. DILLARD.

REFERENCES CITED

The following references are of record in the file of this patent:

UNITED STATES PATENTS

| Number | Name | Date |
| --- | --- | --- |
| 1,586,070 | Cooke | May 25, 1926 |
| 1,586,071 | Cooke | May 25, 1926 |
| 1,634,950 | Lucian | July 5, 1927 |

FOREIGN PATENTS

| Number | Country | Date |
| --- | --- | --- |
| 225,391 | Great Britain | Oct. 13, 1924 |